No. 854,007. PATENTED MAY 21, 1907.
A. ULLMANN.
COCK AND FAUCET.
APPLICATION FILED DEC. 1, 1905.
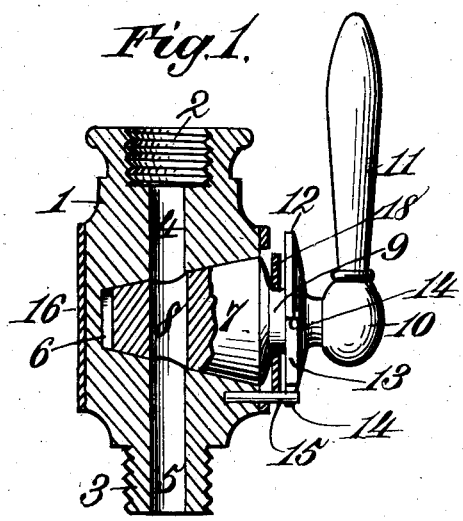
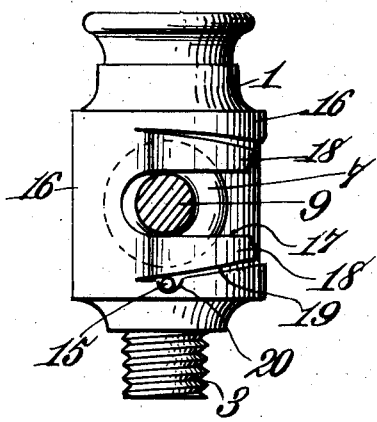
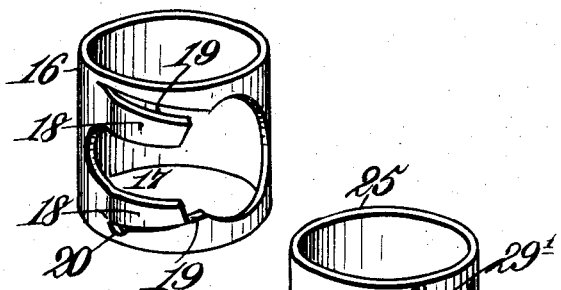
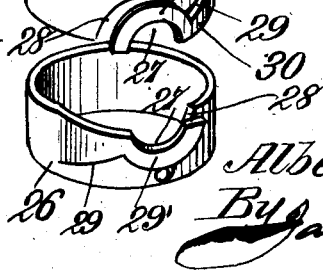
Witnesses
Inventor
Albert Ullmann
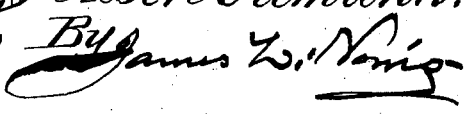

UNITED STATES PATENT OFFICE.

ALBERT ULLMANN, OF MACON, GEORGIA.

COCK AND FAUCET.

No. 854,007.  Specification of Letters Patent.  Patented May 21, 1907.

Application filed December 1, 1905. Serial No. 289,832.

*To all whom it may concern:*

Be it known that I, ALBERT ULLMANN, a citizen of the United States, residing at Macon, in the county of Bibb and State of Georgia, have invented new and useful Improvements in Cocks and Faucets, of which the following is a specification.

This invention relates to improvements in cocks, faucets and the like, and one of the objects thereof is to provide a self-tightening means hereinafter more specifically referred to for securing the plug in position without the employment of washers, screw-nuts, screw-threads and the necessity of providing an opening entirely through the plug casing for the reception of the plug.

In the ordinary cocks or faucets, such as employed for gas, water, or other purposes, the body-portion or plug-receiving casing generally is constructed with two opposite openings through which the plug is passed. The plug is screw-threaded at one end and held in position within the body-portion or plug casing by a washer and screw-nut, and in some instances a spring is used to secure tightness and also to take up loss caused by friction. In the construction of cock, faucet or the like as hereinafter set forth, it is not necessary to provide the body-portion or plug-receiving casing with a pair of opposing openings, or an opening entirely therethrough, for the reason that but a single recess or socket is required in the body-portion or the plug casing to receive the plug. Consequently this manner of constructing the plug or faucet or the like decreases the amount of material necessary for the plug, owing to the fact that the length of the plug is decreased; and furthermore, owing to such manner of construction, it does not necessitate the body-portion of the plug casing being formed with a pair of opposing openings or an opening entirely therethrough. Therefore, it will be evident that a saving in labor and material is obtained. When the plug is mounted in the recess or socket in the body-portion, it is retained in such position through the medium of a clamping shell to be hereinafter more specifically referred to, said shell possessing the function of being self-tightening. Therefore, it will be evident from the employment of the clamping shell that it is not necessary to employ screw-nuts, washers or screw-threads for retaining the plug in position, and under such conditions a saving in material and labor is also obtained.

The self-tightening function of the clamping shell obtains the advantage of automatically retaining the plug in snug contact with the walls of the recess or socket, thereby preventing leakage and taking up the loss caused by friction.

The invention further aims to provide a cock, faucet and the like which shall be simple in its construction, strong, durable, efficient in its use and comparatively inexpensive to manufacture.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views, and in which:

Figure 1 is a sectional view of a cock, faucet or the like in accordance with this invention; Fig. 2 is a side elevation; Fig. 3 is a detail of the clamping shell, and Fig. 4 shows a modified form of clamping shell.

The invention, as aforesaid, relates to improvements in cocks, faucets and the like, but for the sake of brevity, the term "cock" will be employed, and said term is applicable to a faucet or a similar device.

Referring to the drawings by reference characters, 1 denotes the plug casing or body-portion having at one end an internally screw-threaded nipple 2, and at its other end an externally-screw-threaded nipple 3. The nipples 2, 3 are employed for connecting the cock in position. For the sake of brevity, the plug casing or body-portion will be hereinafter referred to as the "body-portion". The body-portion 1 is provided with an inlet passage 4 and an outlet passage 5. These passages are independent of one another and communication is established between them in a manner as hereinafter referred to. The body-portion 1 is formed with an inwardly tapering plug-receiving recess or socket 6 which does not extend entirely through said body-portion, and the said inlet passage 4 and outlet passage 5 open into the said recess or socket 6 at diametrically opposite points.

Within the recess or socket 6 is mounted for rotation a solid tapering plug 7 which is provided with a bore 8 for establishing communication between the inlet passage 4 and the outlet passage 5 when the plug 7 is rotated to such a position that the bore 8 will aline with the said passages 4, 5. The fit between the plug 7 and the wall of the recess or socket 6 is snug to prevent leakage but at the same time will not prevent the rotation of the plug, and the plug 7 is retained in such position through the medium of the shiftable clamping shell to be hereinafter referred to. The plug 7 at its outer end terminates in a narrow neck portion 9, which terminates in the head 10, the latter having a handle 11 fixed thereto. That portion of the head 10 which terminates in the neck 9 is enlarged, as at 12, and cut away, as at 13, so as to form a pair of shoulders 14 which are adapted to engage an outwardly-extending stop 15 so that the movement of the plug 7 will be limited in both directions. The stop 15 is secured in the wall of the recess or socket 6, said wall being cut away in such a manner as to receive the said stop 15, but the position of that portion of the stop 15 within the recess is such that it will not interfere with the rotating movement of the plug 7.

The shiftable clamping shell for retaining the plug 7 in position in the recess or socket 6 is indicated by the reference character 16 and which tightly surrounds the periphery of the body-portion 1. The said shell 16 is provided with a key-hole slot 17, one portion of said slot being of such diameter as to permit the plug being positioned in the body-portion 1, and the other portion of said slot is of such width that when the shell is shifted, it will enable the shell to straddle the neck-portion 9 and engage the outer end of the plug, thereby retaining the plug in position. That portion of the shell 16 which engages the end of the plug consists of a pair of spring-retaining arms 18 formed by splitting the shell, as at 19; and the said shell is further provided with a notch 20 to receive the stop 15. The diameter of the clamping shell with respect to the diameter of the body-portion 1 is such that when the clamping shell is mounted upon said body-portion, it will tightly engage therewith so that it cannot be shifted except by the employment of a suitable instrument. Therefore when the shell is moved to position to retain the plug in the body-portion 1, it cannot become accidentally displaced. From the construction and arrangement of the clamping shell, it is evident that when the shell is moved to one position, it will securely retain the plug in position, and owing to the action of the spring arms formed in the shell, said spring arms will have a tendency to constantly force the plug in the body-portion, thereby performing what may be termed a self-tightening function, and also take up any loss of material caused by friction between the plug and the wall of the recess or socket 6. When the clamping shell is moved to its other position, that is to say, when the spring arms are shifted from engagement with the plug, the plug can be very conveniently removed from the body-portion 1.

From the foregoing construction of cock, it is evident that the employment of washers, screw-nuts and screw-threads is dispensed with for rotatably securing the plug in the body-portion, as the clamping shell performs such function; and it is also evident from the construction of cock hereinbefore set forth, that a considerable saving of labor and material is obtained when manufacturing the same.

In the modified form of clamping shell shown in Fig. 4, the same consists of two sections 25, 26, each of which is formed with a semicircular cut away portion 27, said semicircular cutaway portions opposing each other when the shell is in position. Each of the sections 25, 26 is furthermore provided with a curvilinear slit 28 which terminates in an angularly extending slit 29, forming thereby a spring arm 30 with the free end thereof 29', shaped in a substantially semi-circular manner. The spring arm of one section extending in an opposite direction with respect to the spring arm of the other section. The opposing of the semi-circular cutaway portions of the sections forms a circular opening for the reception of the neck portion of the plug. Instead of shifting the modified form of shell upon the plug in a manner as called for by the construction of shell shown in Figs. 1 and 3, each half of the modified form of shell is positioned upon the neck of the plug in an opposite direction, after the plug is inserted in the body portion, by being pushed or shoved thereon. The spring arm of the modified form of shell surrounds the neck of the plug completely. This makes a somewhat neater construction and also causes the pressure of the springs to be evenly distributed, consequently setting up a spring retaining means for the plug.

Having thus fully described my invention, what I claim as new and desire to secure by Letters Patent, is:

1. A body-portion having an inlet and an outlet and a plug-receiving socket, a plug mounted in said socket and having a port for establishing communication between the inlet and the outlet of the body-portion, and means surrounding the periphery of the body-portion and engaging the plug for rotatably securing it in position.

2. A body-portion having an inlet and an outlet and a plug-receiving socket, a plug mounted in said socket and having a port for establishing communication between the inlet and the outlet of the body-portion, and a shiftable means surrounding the periphery of the body-portion and adapted when moved in one direction to rotatably secure the plug in position and when shifted to another position adapted to permit of the removal of the plug.

3. A body-portion having an inlet and an outlet and a plug-receiving socket, a plug mounted in said socket and having a port for establishing communication between the inlet and the outlet of the body-portion, means surrounding the periphery of the body-portion and engaging the plug for rotatably securing it in position, and a stop carried by the body-portion and adapted to be engaged by the plug for limiting the rotatable movement thereof.

4. A body-portion having an inlet and an outlet and a plug-receiving socket, a plug mounted in said socket and having a port for establishing communication between the inlet and the outlet of the body-portion, a shiftable means surrounding the periphery of the body-portion and adapted when moved in one direction to rotatably secure the plug in position and when shifted to another position adapted to permit of the removal of the plug, and a stop carried by the body-portion and adapted to be engaged by the plug for limiting the rotatable movement thereof.

5. A cock comprising a body-portion, a rotatable plug, and a clamping shell surrounding the body-portion for retaining the plug in position.

6. A cock comprising a body-portion, a rotatable plug, a self-tightening means for said plug surrounding the body-portion, and a stop for limiting the movement of the rotatable plug in either direction.

7. A cock comprising a body-portion provided with an inlet and an outlet and a tapering recess, a rotatable and tapering closure member for said outlet and inlet extending in said recess, and a self-tightening means surrounding said body-portion and engaging with the plug for retaining it in the recess.

8. A cock comprising a body-portion provided with an inlet and an outlet and a tapering recess, a rotatable and tapering closure member for said outlet and inlet extending in said recess, a self-tightening means surrounding said body-portion and engaging with the plug for retaining it in the recess, and a stop carried by the body-portion and adapted to limit the movement of said member in either direction.

9. A body-portion having an inlet and an outlet and a tapering recess, a rotatable and tapering closure member extending in said recess and adapted to establish communication between the inlet and outlet, and a clamping shell surrounding said body-portion and provided with a pair of spring arms adapted to engage said member for retaining it in position.

10. A body-portion having an inlet and an outlet and a tapering recess, a rotatable and tapering closure member extending in said recess and adapted to establish communication between the inlet and the outlet, a clamping shell surrounding said body-portion and provided with a pair of spring arms adapted to engage said member for retaining it in position, and a stop carried by the body-portion and engaging said member for limiting the movement thereof in either direction.

11. A cock comprising a body-portion having openings, a closure member for said opening, and an exteriorly-arranged self-tightening cylindrical clamping shell for retaining said member in position.

12. A cock comprising a body-portion having openings, a closure member for said openings, a self-tightening cylindrical clamping shell for retaining said member in position, and means for limiting the movement of said member.

13. A cock comprising a closure member, and a shiftable shell adapted when moved in one direction to retain the closure member in position and when shifted in another direction to permit of the removal of the closure member.

14. A cock comprising a closure member, a shiftable shell adapted when moved in one direction to retain the closure member in position and when shifted in another direction to permit of the removal of the closure member, and means for limiting the movement of said closure member when the same is secured in position by said shell.

15. A cock comprising a body-portion having openings, and a closure member for said openings, a shiftable shell adapted when moved in one direction to retain the closure member in position and when shifted in another direction adapted to permit of the removal of the closure member.

In testimony whereof I have hereunto set my hand in presence of two subscribing witnesses.

ALBERT ULLMANN.

Witnesses:
 MATT. R. FREEMAN,
 JOHN T. MINOR.